US006693755B2

(12) United States Patent
Maple et al.

(10) Patent No.: US 6,693,755 B2
(45) Date of Patent: Feb. 17, 2004

(54) DATA STORAGE

(75) Inventors: Catharine Anne Maple, Bristol (GB); Jonathan Peter Buckingham, Bristol (GB); Paul Frederick Bartlett, Bristol (GB)

(73) Assignee: Hewlett-Packard Development Company, L.C., Houston, TX (US)

( * ) Notice: Subject to any disclaimer, the term of this patent is extended or adjusted under 35 U.S.C. 154(b) by 359 days.

(21) Appl. No.: 09/917,781

(22) Filed: Jul. 31, 2001

(65) Prior Publication Data
US 2003/0026025 A1 Feb. 6, 2003

(51) Int. Cl.⁷ .............................. G11B 5/09; H04L 1/00
(52) U.S. Cl. ................................ 360/53; 360/48; 714/6; 714/746
(58) Field of Search .............................. 360/48, 77.12, 360/75, 53; 714/6, 746–747, 764

(56) References Cited

U.S. PATENT DOCUMENTS

| | | | |
|---|---|---|---|
| 4,559,568 A | | 12/1985 | Watanabe et al. |
| 4,604,657 A | | 8/1986 | Fukami et al. |
| 4,700,240 A | | 10/1987 | Umemoto et al. |
| 5,012,459 A | * | 4/1991 | Odaka et al. .................. 360/32 |
| 5,353,175 A | | 10/1994 | Chiba |
| 5,396,374 A | | 3/1995 | Kubota et al. |
| 5,434,719 A | * | 7/1995 | Miller et al. .................. 360/53 |
| 5,446,604 A | | 8/1995 | Chiba |
| 5,450,250 A | | 9/1995 | Garcia et al. |
| 6,282,040 B1 | * | 8/2001 | Bartlett ......................... 360/48 |
| 6,288,862 B1 | * | 9/2001 | Baron et al. ................... 360/55 |
| 6,522,831 B2 | * | 2/2003 | Tanaka et al. ............... 386/116 |

FOREIGN PATENT DOCUMENTS

| | | | |
|---|---|---|---|
| EP | 0286412 A3 | 10/1988 | |
| EP | 0624875 A2 * | 11/1994 | ........... G11B/27/30 |
| EP | 0831482 A2 | 3/1998 | |
| EP | 0936618 A2 | 8/1999 | |
| EP | 0944199 A1 * | 9/1999 | ............. H04L/1/00 |

* cited by examiner

Primary Examiner—David Hudspeth
Assistant Examiner—Dan I Davidson

(57) ABSTRACT

A data reader is arranged to read data comprising user data and non-user data written across at least two channels of a data-holding medium, the data being arranged into a plurality of data items each containing user data and non-user data, with the non-user data holding information relating to the user data, including a header with information relating to the user data and header error detection information, and data items written across the channels at the same time being identified as a set of data items. The data reader has a read head for reading a respective channel of the data-holding medium to generate a data signal comprising the data items, and processing circuitry arranged to receive and process the data signals of a set of data items, including processing the header error detection information of each of the headers of the data items in the set to detect any of the headers which are in error, and also processing the headers to obtain information from a correct header to correct a header which is in error. Correcting the headers enables more of the data items to be recovered for use.

15 Claims, 5 Drawing Sheets

| WP | ACN | Dataset No. | Designator | (calculated) |
|---|---|---|---|---|

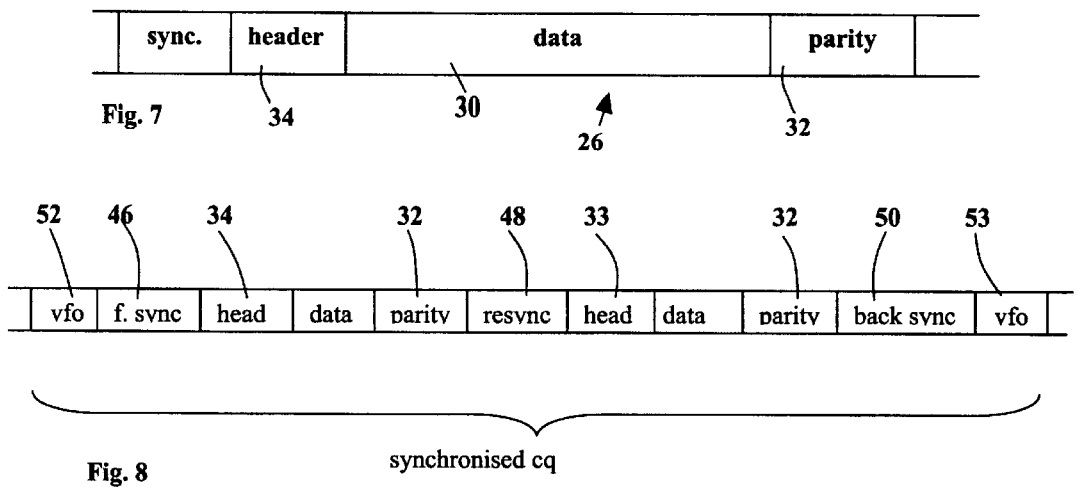
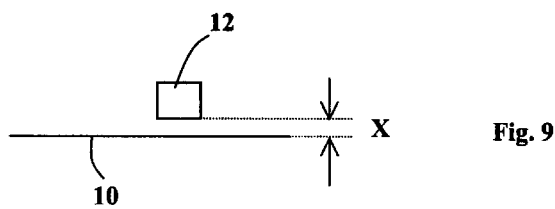
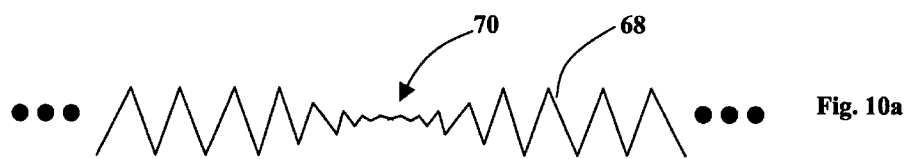
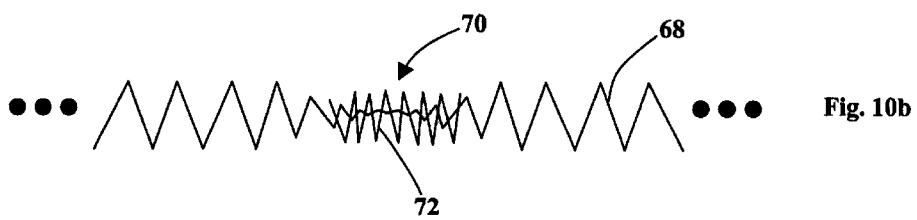
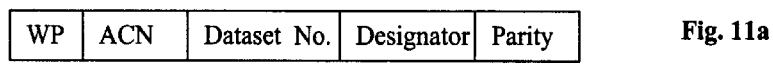
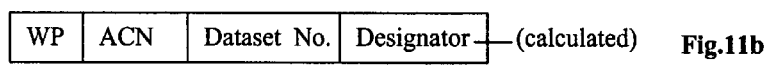

DATA STORAGE

FIELD OF THE INVENTION

This invention provides an improved data storage device, which may be a tape drive arranged to receive data from a computer, or the like. The invention also provides related methods.

BACKGROUND OF THE INVENTION

An example of a data storage device is the tape drive, which receives user data from computers, particularly, but not exclusively to back-up the user data held on the computer onto a data-holding medium. In such back-up applications it is of prime importance that the user data is retrievable, since generally, this copy is the back-up copy that will only be required if the original has been lost or damaged. Therefore, there is an ongoing need to ensure that back-up data storage devices are as robust and secure as possible.

Once user data has been stored on the data-holding medium it can be held there for long periods. To recover the user data from the data-holding medium the data storage device must read the data-holding medium and regenerate the user data originally stored there. In some devices the user data backed-up on the data-holding medium accounts for only about 40% of the overall information held on the data-holding medium. The remaining 60% of the information is non-user data, such as headers or error detection and correction information that attempts to make the user data as secure as possible.

Therefore, in order to read the user data the storage device must accurately detect which is the user data within all of the information held on the data-holding medium. In view of the amount of information other than user data that is held on the data-holding medium, this can be problematic.

The storage device must also be able to detect and correct as many as possible of the errors which may have occurred in writing the user data to the data-holding medium or reading the user data from it, using the error detection and correction information, The user data is normally split into discrete items, each item including the user data, the error detection and correction information and a header denoting its position in the writing sequence, a write pass number and header error detection information. If the header is corrupted, the data storage device will be able to detect this, but may not be able to correct it, so that the user data in that data item cannot be recovered. Some known data storage devices are able to correct the header, but not reliably, so that the user data in that data item may not be recovered accurately.

SUMMARY OF THE INVENTION

It is an object of the present invention to detect and then reliably correct errors in the header of a data item, particularly where the storage device writes a set of several data items at the same time on different channels.

According to a first aspect of the invention, a data reader is arranged to read data comprising user data and non-user data written across at least two channels of a data-holding medium, said data being arranged into a plurality of data items each containing user data and non-user data, with said non-user data holding information relating to said user data, including a header with information relating to said user data and header error detection information, and data items written across the said channels at the same time being identified as a set of data items, said data reader having a read head for reading a respective said channel of said data-holding medium to generate a data signal comprising said data items, and processing circuitry arranged to receive and process said data signals of a set of data items, including processing said header error detection information of each of said headers of said data items in said set to detect any of said headers which are in error, and further processing said headers to obtain information from a correct said header to correct a said header which is in error.

A set of data items written at the same time will have the same header information relating to write pass, and the general position in the writing sequence, while the header information specific to the channel to which the data item is written will be different. However, the channel specific information for a correct header can be used to derive the channel specific information for an incorrect header, so that all the important header information can be reconstructed accurately and reliably. This increases the number of data items that can be recovered and used.

Thus, as long as the processing circuitry can access the information relating to the channel assigned to each data item, this can be used to correct header information.

Preferably, the processing circuitry, on detecting a header which is in error, then determines a data item with a correct header, and modifies information taken from said correct header in order to correct said header which is in error.

A correct header is defined as one where the header error detection information is correct. The processing circuitry preferably creates a new header by taking information such as the write pass and the general writing sequence position from the correct header, and modifying the channel specific information from the correct header. The new header is preferably written to a spare memory storage area in the processing circuitry. This has the advantage that the header which is in error is still available if required.

Conveniently, the new header does not contain the header error detection information, as this is no longer necessary.

In a preferred embodiment, the data reader has eight read heads, reading eight data channels. The data reader may have any number of read heads, from two up to, for example sixteen, although any number is possible. The way in which the channel specific information is modified will depend on the number of channels.

According to a second aspect of the invention, we provide a data storage device incorporating a data reader according to the first aspect of the invention.

In the preferred embodiment, the data storage device is a tape drive. Such a tape drive may be arranged to read data held in any of the following formats: LTO (Linear Tape Open), DAT (Digital Audio Tape), DLT (Digital Linear Tape), DDS (Digital Data Storage), or any other format, although in the preferred embodiment the tape is LTO format.

Alternatively, the data storage device may be any one of the following: CDROM drive, DVD ROM/RAM drive, magneto optical storage device, hard drive, floppy drive, or any other form of storage device suitable for storing digital data.

According to a third aspect of the invention, we provide a method of reading data comprising user data and non-user data written across at least two channels of a data-holding medium, said data being arranged into a plurality of data items each containing user data and non-user data, with said non-user data holding information relating to said user data, including a header with information relating to said user data and header error detection information, and data items written across the said channels at the same time being identified as a set of data items, said method comprising:

reading each said channel of said data-holding medium;

generating a data signal comprising said data items for each channel;

processing said data signals of a set of data items, including processing said header error detection information to detect any of said headers of said set of data items which are in error; and correcting a said header which is in error by obtaining information from a correct said header.

The method enables reconstruction of an incorrect header from a correct one, as the set of data items will have the same header information relating to write pass, and general position in writing sequence, but different channel specific information. The channel specific information for a correct header can be used to derive the channel specific information for a header which is in error. This increases the number of data items which can be recovered and used.

The step of correcting the header includes determining a header which is correct, and modifying information taken from said correct header to correct said header which is in error.

Determining a correct header includes checking that the header error detection information is correct. Correcting a header which is in error includes creating a new header by taking information, such as the write pass and the general writing sequence position from a correct header and modifying the channel specific information from the correct header.

Correcting the header also includes writing the new header to a spare memory storage area in the data reader.

According to a fourth aspect of the invention there is provided a computer readable medium having stored therein instructions for causing a processing unit to execute the method of the third aspect of the invention.

The computer readable medium, although not limited to, may be any one of the following: a floppy disk, a CDROM, a DVD ROM/RAM, a ZIP™ disk, a magneto optical disc, a hard drive, a transmitted signal (including an internet download, file transfer, etc.).

BRIEF DESCRIPTION OF THE DRAWINGS

An embodiment of the invention is described by way of example only in the accompanying drawings, in which

FIG. 7 shows more detail of data as written to tape;

FIG. 8 shows further detail of data as written to tape;

FIG. 9 shows schematically the position of a read head in relation to a tape;

FIGS. 10a and b show schematically problems that may occur with a signal being read from a tape and FIGS. 11a and b show diagrammatically the parts of a header.

DETAILED DESCRIPTION OF THE INVENTION

Figure 1:
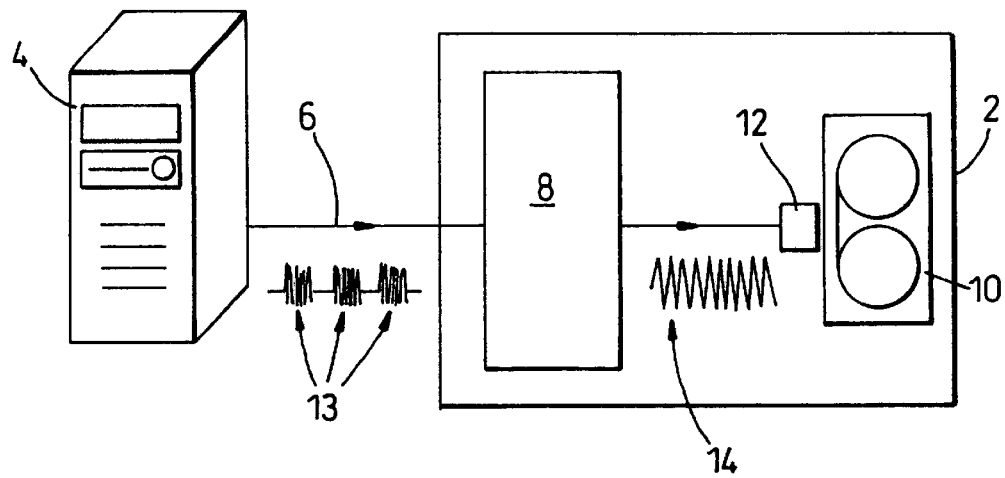
FIG. 1 is a schematic diagram of a computer connected to a tape drive according to the present invention.

Turning to FIG. 1, a tape drive 2 is shown connected to a computing device 4. The computing device 4 may be any device capable of outputting data in the correct format to the tape drive 2, but would typically be a device such as a computer referred to as a PC, an APPLE MAC™, etc. These machines may run a variety of operating systems such as for example MICROSOFT WINDOWS™, UNIX, LINUX, MAC OS™, BEOS™. Generally, because of the high cost of the tape drive 2 it would be connected to a high value computer such as a network server running WINDOWS NT™ or UNIX.

A connection 6, in this case a SCSI link, is provided between the computing device 4 and the tape drive 2, which allows data to be transferred between the two devices. The tape drive 2 contains control circuitry 8, which includes a buffer capable of receiving and buffering data received from the computing device 2. A tape 10 has been inserted into the tape drive and is capable of having data written thereto and read therefrom by a set of write and read heads 12. In this embodiment there are eight read and eight write heads. The tape drive corresponds to the LTO format and typically receives tapes having a capacity of the order of 100 Gbytes.

The processing circuitry further comprises memory in which data read from the tape is stored whilst it is being decoded, together with electronics that is arranged to read and decode data from the tape 10.

Data sent by such computing devices is generally sent in bursts, which results in packets of data 13 that need to be smoothed in order that they can be sequentially recorded by the tape drive. Therefore, the buffer within the control circuitry 8 buffers these bursts and allows data to be continuously 14 written to the tape 10.

Figure 2:
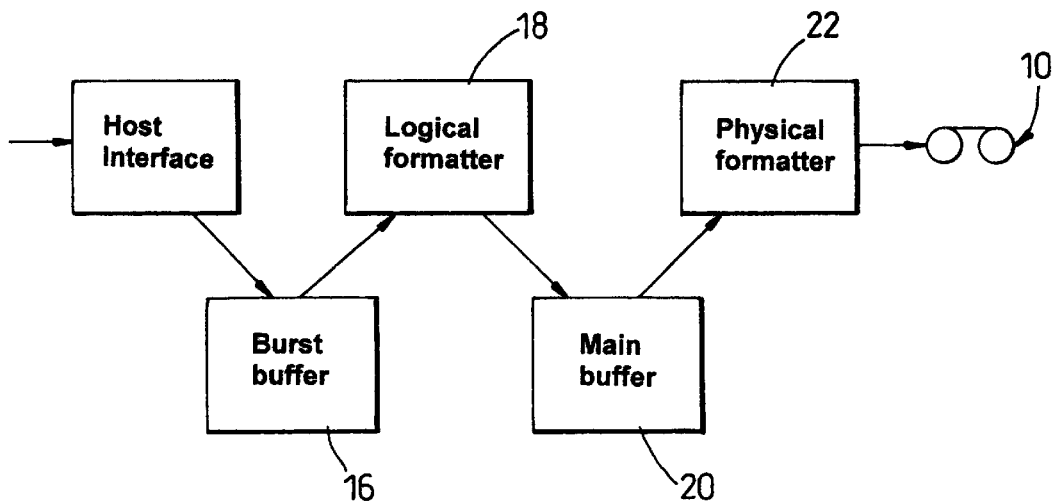
FIG. 2 is a schematic diagram showing the main components of the tape drive of FIG. 1.

The control circuitry is shown in more detail in FIG. 2, which shows a number of portions of the control circuitry 8. The computing device is represented by the left most box of the Figure. The control circuitry 8 comprises a burst buffer 16 that has a capacity of 128 Kbytes and is arranged to receive data from the computing device 4. A logical formatter 18 is provided to perform initial processing of the data received by the burst buffer 16. A main buffer 20 is provided having a capacity of 16 Mbytes and is arranged to hold data that is waiting to be written to the tape 10, and also holds data that is being read from the tape 10 before being sent to the computing device 4. The final block shown in FIG. 2 is the physical formatting block 22, which performs further processing on the data before it can be written to the tape 10, details of which will be given below.

Data received by the tape drive 2 from the computing device 4 is first passed to the burst buffer 16. The burst buffer 16 is required to ensure that the tape drive 2 can receive the high speed bursts of data sent by the computing device 4, which may otherwise be received too rapidly for the logical formatter 18 to process in time. The burst buffer 16 is of a First In First Out (FIFO) nature so that the order of the data is maintained as it is passed to the logical formatter 18.

The logical formatter 18 compresses the data received and arranges it into a first data structure described hereinafter. Once the data has been processed in this manner it is passed to the main buffer 20, also of a FIFO nature, to await further processing before being written to the tape 10. The capacity of the main buffer 20 is much greater than that of the burst buffer 16 so that it can act as a reservoir of information should data be received from the computing device 4 at too great a rate, and can be used to allow writing to continue should data transmission from the computing device 4 be suspended.

The physical formatter 22 handles the writing of the data to the tape, which includes read while writing retries (RWW retries), generation of first and second levels of error correction (C1 and C2), generation of headers, RLL modulation, sync, fields, and provides data recovery algorithms. These terms will be expanded upon hereinafter.

Figure 3:
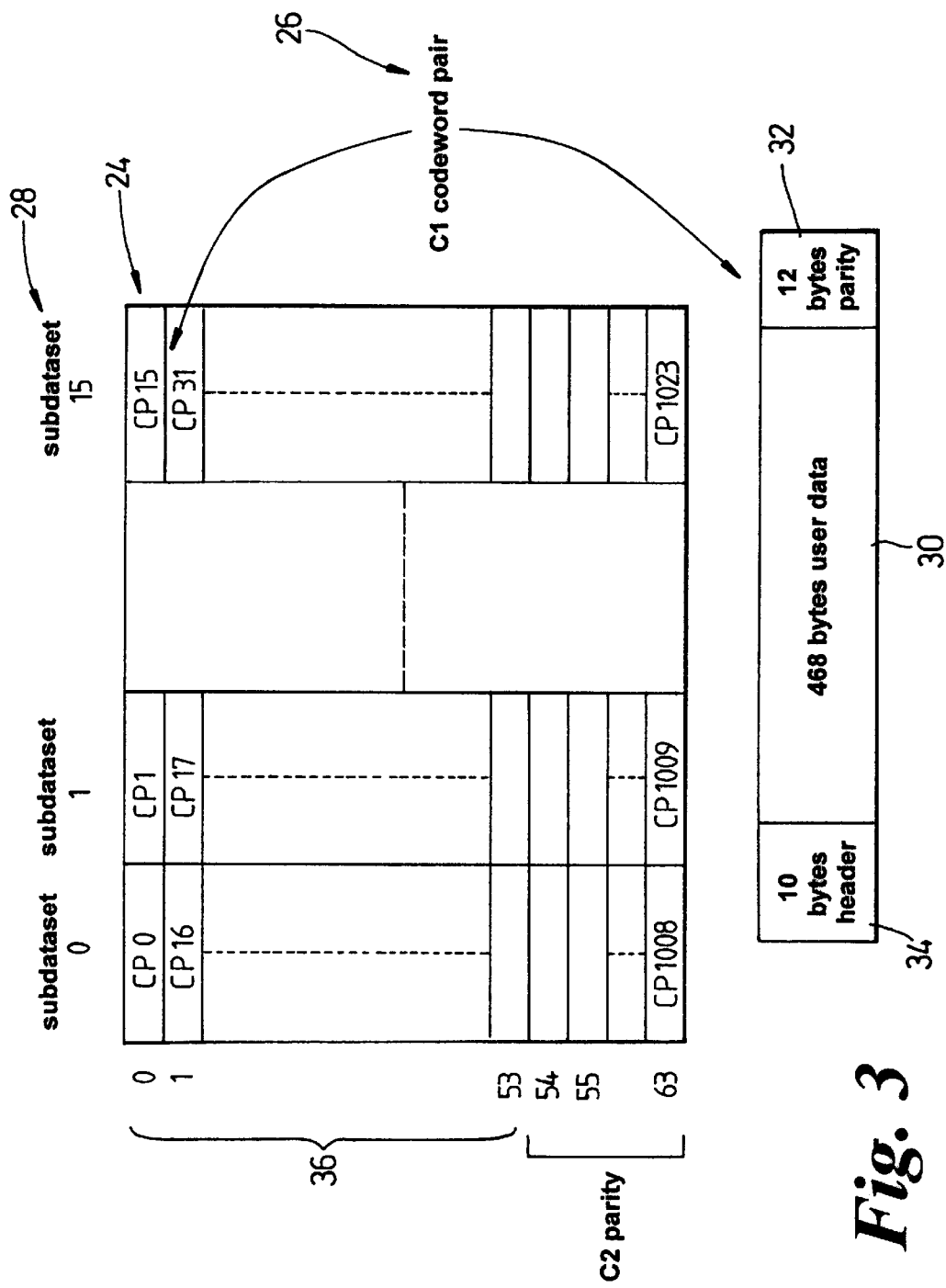
FIG. 3 shows the structure into which data received by the tape drive is arranged.

As written to the tape 10, the data is arranged in a data structure 24, or dataset, as shown in FIG. 3, details of which are as follows. The dataset typically holds 400 Kbytes of compressed data, and comprises a matrix of 64×16 C1 codeword pairs (CCP) 26 and there are therefore 1024 CCPs within a dataset. Each column of the matrix is referred to as a sub-dataset 28, and there are thus 16 sub-datasets within a dataset.

Each CCP, as its name suggests, comprises two code words, each containing 234 bytes of user data, together with 6 bytes of parity information (C1 error correction data), which allows the detection and correction of 3 bytes in error within any CCP. Therefore, each CCP comprises 468 bytes of user data 30 and 12 bytes of parity information 32. The CCP is also headed by a 10 byte header 34.

Rows zero to fifty-three 36 of the dataset 24 hold user data and C1 parity information. Rows fifty-four to sixty-three hold data providing the second level of error correction, C2 parity information.

Figure 4:
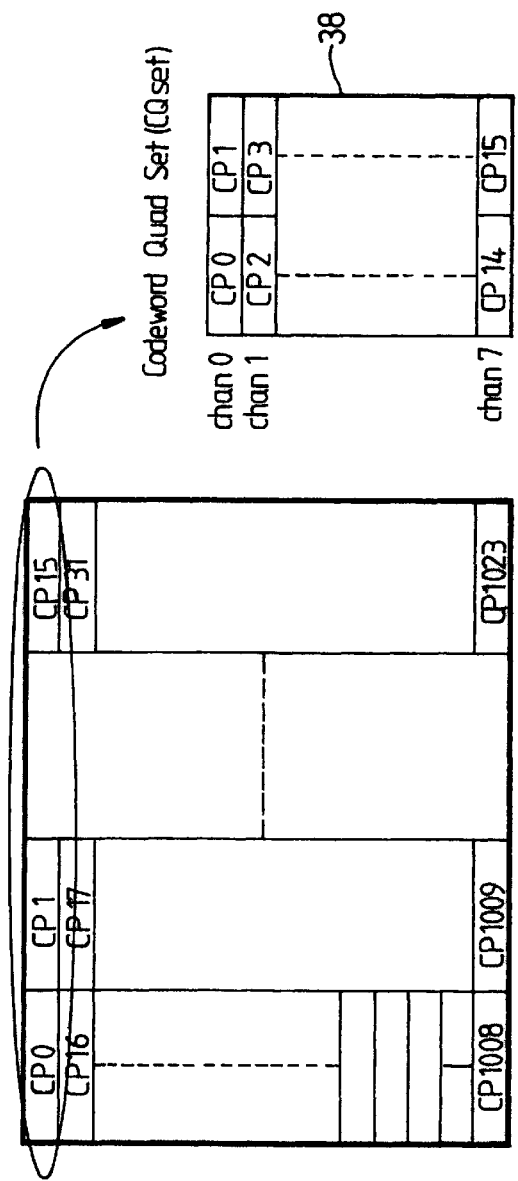
FIG. 4 shows further detail of the data structure of FIG. 3 and how the data is written to the tape.

In general, when the physical formatter 22 writes data to the tape 10 it writes the datasets 24 sequentially, each as a codeword quad set (CQ set) 38, as shown in FIG. 4. This shows that row zero is written first, then row one, up to row 63. Each row is written across all the write heads 12 (channel 0 to channel 7). Each CQ set 38 can be represented as a 2×8 matrix, with each cell of the matrix containing a CCP 26 from the dataset. Each row of the 2×8 matrix is written by a separate write head 12, thus splitting the CQ set 38 across the tape 10.

Figure 5:
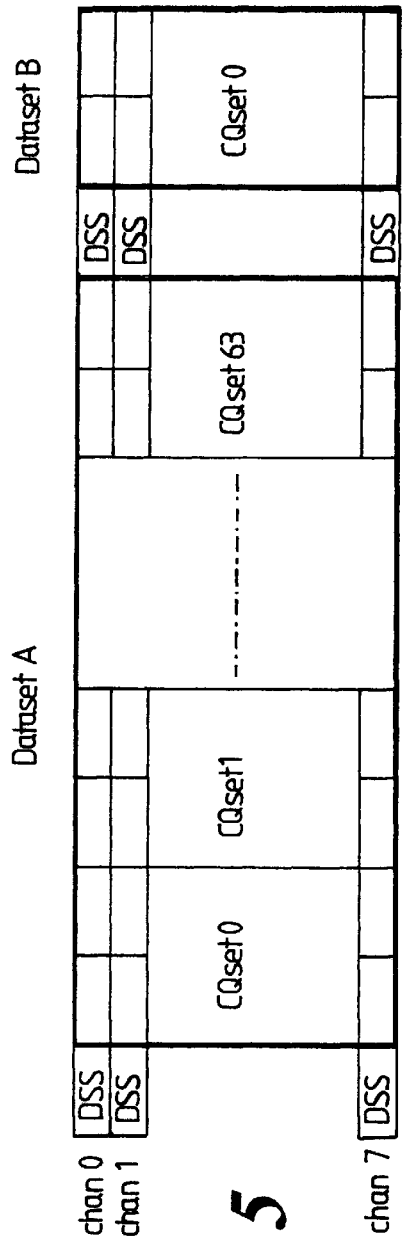
FIG. 5 shows further detail of the data structure of FIGS. 3 and 4, and shows the physical arrangement of the data on the tape.

Thus, the 1024 CCPs 26 from a dataset 24 are written as 64 CQ sets, as shown in FIG. 5. Between each dataset, a dataset separator (DSS) is recorded on the tape 10.

Figure 6:
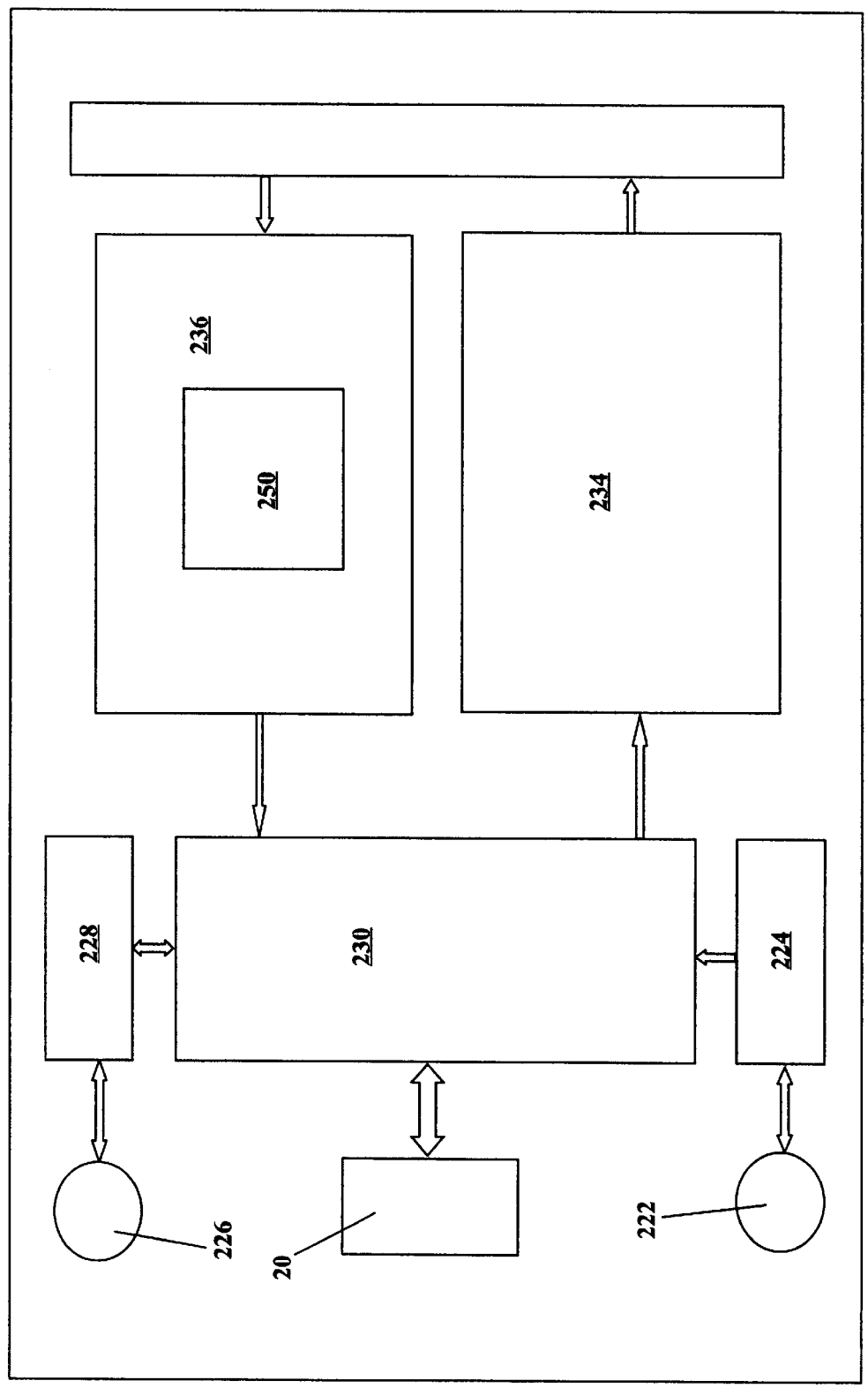
FIG. 6 is a schematic diagram of a formatter for the data.

The operation of the physical formatter 22 is shown in more detail in FIG. 6. The physical formatter 22 comprises the buffer 20, a write controller 222 controlling a write chain controller 224, and a read controller 226 controlling a read chain controller 228. The write chain controller and the read chain controller both interact with a function processing block 230, which generates the C1 and C2 parity bytes, sends data to a CCQ writer 234 for writing onto the tape channels, and receives data read from the tape channels by a CCQ reader 236. The physical formatter 22 is executed as hardware, with the exception of the write controller 222 and the read controller 226, which are firmware.

The write chain controller 224 operates the function block 230 to generate a CCP 26 from the data in the buffer 20 complete with C1 and C2 error correction information. The write chain controller 224 also generates the 10 header bytes 34, which are added by the function block 230.

The CCP 26 is then passed from the function block 230 to the CCQ writer 234, along with further information from the write chain controller 224, including whether it is the first or the second in a CQ set 38, and whether it should be preceded by a dataset separator DSS, and which channel (0 to 7) it should be written to.

The information in the header 34 is critical, and is shown diagrammatically in FIG. 11a. It includes a designator of its position in the dataset matrix 24 (a number from 0 to 1023), a dataset number, a write pass number WP (to be explained in more detail below), an absolute CQ sequence number ACN (all generated by the write chain controller 224), and two Reed Solomon header parity bytes, which are generated by the function block 230. These header parity bytes enable errors in the header 34 to be detected, but not necessarily corrected.

The CCPs 26 passed to the CCQ writer 234 are allocated to a particular channel (0 to 7). Further processing adds synchronisation (sync) fields before each header 34 (see FIG. 7). This enables headers 34 to be recognised more easily when the data is read.

As shown in FIG. 8 three separate sync fields are used: a forward sync 46, a resync 48 and a back sync 50. The forward sync 46 is positioned before the header 34 of the first CCP 26 of a CQ set 38. The resync 48 is positioned between the two CCPs 26 of a CQ set 38 (i.e. after the parity data 32 of the first CCP 26 and before the header 33 of the second CCP 26). The back sync 50 is positioned after the parity data 32 of the second codeword pair 26 within the CQ set 38.

The forward sync 46 is preceded by a VFO field 52 which comprises the data 000010 followed by a number of occurrences of the bit sequence 101010. The back sync field 50 is followed by a VFO field 53 that comprises the data 000010 followed by a number of occurrences of the bit sequence 101010, The VFO field 52 is easily detectable by the processing circuitry reading data from the tape 10, and alerts it to the fact a forward sync field 46 is to follow. The back sync 50 and VFO 53 are used in a similar way when the tape 10 is read backwards. The portion of the tape comprising a forward sync 46 to a back sync 50 comprises a synchronised CQ set 38. The headers 33, 34 contain information as to the identity of the data and the reading of the headers determines how the processing circuitry decodes the data. A DSS is put at the beginning of a dataset.

The dataset is then written to the tape 10 by the eight write heads 12 according to the channels (0 to 7) assigned by the write chain controller. When writing, the write pass number contained in the header 34 is of importance. As can be seen in FIG. 9, when writing data, the physical separation X between the write heads 12 and tape 10 can vary. If the write head 12 moved away from the tape 10 when data was being written (i.e. X increased), then when that data is read back the signal strength at the point corresponding to the increase in X during writing will be much weaker. This is represented in FIG. 10a in which the signal 68 is weakened in the region 70. Such regions are referred to as regions of drop-out. The increased distance X can be caused by a number of factors, including the presence of dirt on the tape 10 and ripples in the tape 10.

Whilst the tape 10 contains no information then a drop-out region 70 simply results in a loss of signal during reading, and would generate a read while writing retry (as explained below). However, if the tape 10 contained information that was being overwritten then because of the reduced field during writing the existing data would not be erased and would remain on the tape 10 and this is shown in FIG. 10; the new signal 68 is shown with a drop-out region 70 as in FIG. 10a, but an existing signal 72 remains in this drop-out region. This existing signal is referred to a region of drop-in.

Drop-in regions must be accounted for during reading of information from the tape 10, and the write pass number described above is used to achieve this. All data that is written to the tape 10 is written with a write pass number, which for a particular tape is incremented each time data is written thereto. Consequently, a drop-in region of existing signal 72 will have a lower write pass number than the newer signal 68 that surrounds it. If the write pass drops during the middle of a dataset as data is being read from the tape 10, this indicates that a region of drop-in has been encountered. The current write pass number is held in the CCQ reader 236.

The data being written to the tape 10 is also read by the eight read heads. The data read is passed to the CCQ reader 236, where it is processed, as explained below, before being passed to the function block 230 for detection and correction and for checking by the read chain controller 228. If the tape drive is in Read While Writing mode, the write chain controller 234 checks the CCPs to determine which CQ sets 38 are in error, and so need rewriting to the tape 10.

If the tape drive is in Reading mode, that is, for restoration of data, the CCPs 26 are passed to the buffer 20 to await sending back to the computer device 4.

The invention lies in the CCQ reader 236, which is arranged to detect and in particular to correct errors in the CCP headers 34 before the CCPs 26 are passed to the function block 230. This is advantageous, as it increases the number of CCPs 26 which can be used to recover data, if the header errors cannot be corrected the CCP 26 cannot be used and will require the CQ set to be rewritten (in RWW mode) or the data to be lost (in restoration mode). The CCQ reader 236 also looks at the write pass number of each CCP 26, enabling drop-ins to be filtered out by the CCQ reader 236. This ensures that the CCPs 26 passed to the function block 230 are as error-free as possible.

In general terms, the CCQ reader 236 gets a data signal from all the read heads, each head passing data through a separate channel (0 to 7). The CCQ reader 236 has a processing block 250 which looks for a VFO signal 52, followed by a forward sync 46, so that the header of a CCP 26 can be detected. Once a CCP 26 has been detected, it is processed in the block 250, including for each CCP a write pass check, and a header parity check, to establish any headers 34 that are in error.

The block 250 discards any CCPs 26 that are drop-ins, and corrects the headers 34 if possible. Then CCPs without header errors are multiplexed to the function block 230 for error correction and further processing by the read chain controller.

In order to correct errors in the CCP headers 34, the CCQ reader 236 must identify CCPs 26 which have been written at the same time, as the headers 34 will contain similar information, so that information from the correct headers can be used to interpolate information into the incorrect headers. Because the write heads 12 may not be precisely aligned, CCPs written simultaneously will not arrive at the CCQ reader 236 on all channels simultaneously. It is then necessary to detect which were written at the same time, these being known as a CCP set. Detection of CCP sets can be done by any suitable method.

When a CCP set is detected, the CCQ reader 236 checks the parity of each header 34 of its CCPs, as well as the write pass number in any suitable way, using the block 250. If both are correct, the CCP is sent to the function block 230.

If the write pass number is incorrect, that is, lower than the current value held by the CCQ reader 236, the block 250 discards the CCP as a drop-in, so that it is not sent to the function block 230.

However, if the header parity is incorrect, the block 250 attempts to correct the error by interpolating (creating) a new header, To interpolate the header, the block 250 takes information from the header of the first CCP in the CCP set where the header parity and write pass are both correct, and modifies it. If there are no such headers, no correction can be performed.

As can be seen from FIG. 4, the headers of all the CCPs in a CCP set will have the same dataset number, write pass number and absolute CQ sequence number. They will have different designators (representing position in dataset matrix 24—a number from 0 to 1023) and parity bytes. It is only the designator that needs modifying, as the parity bytes no longer have any relevance and can be ignored.

Looking at FIG. 4, it will be seen that the designators of a CCP set will consist of either even or odd numbers within a 16 number band. For example, the first CCP set in FIG. 4 consists of CP0, CP2, CP2 . . . CP14, while the second CCP set consists of CP1, CP3, . . . CP15. The difference in the designators of all the CCPs in a CCP set lies only in the four least significant bits. The designator of the incorrect header is therefore calculated by incrementing the designator of the correct header by an amount determined by the difference between the channels of CCPs with the correct and incorrect headers. For example, if in FIG. 4, the header for CP0 on channel 0 is correct, and that for CP6 on channel 3 is incorrect, the new designator for CP6 is calculated by incrementing the CP0 designator by 6 (twice the difference between the channels). Any carryover is ignored as irrelevant. The interpolated header is shown diagrammatically in FIG. 11b, with the write pass, ACN and dataset number from the old header, the calculated designator, and no parity bytes.

If the data storage device has a different number of channels, the calculation of the new header will be changed accordingly.

The block 250 then writes the interpolated header into spare bytes in the CCQ reader 236, for passing to function block 230. This retains the old header so that it can be used for diagnostic purposes if necessary.

What is claimed is:

1. A data reader arranged to read data comprising user data and non-user data written across at least two channels of a data-holding medium, said data being arranged into a plurality of data items each containing user data and non-user data, with said non-user data holding information relating to said user data, including a header with information relating to said user data and header error detection information, and data items written across the said channels at the same time being identified as a set of data items, said data reader having a read head for reading a respective said channel of said data-holding medium to generate a data signal comprising said data items, and processing circuitry arranged to receive and process said data signals of a set of data items, including processing said header error detection information of each of said headers of said data items in said set to detect any of said headers which are in error, and further processing said headers to obtain information from a correct said header to correct a said header which is in error.

2. A data reader according to claim 1, wherein said processing circuitry, on detecting a header which is in error, then determines a said data item with a correct said header, and modifies information taken from said correct header in order to correct said header which is in error.

3. A data reader according to claim 2, wherein a said correct header is defined as one wherein said header error detection information is correct.

4. A data reader according to claim 3, wherein said processing circuitry creates a new header by taking correct header information from said correct header, and modifying channel specific information from said correct header.

5. A data reader according to claim 4, wherein said header information is a write pass number, and a general writing sequence position.

6. A data reader according to claim 4, wherein said new header is written to a spare memory storage area in said processing circuitry.

7. A data reader according to claim 6, wherein said new header does not contain the header error detection information.

8. A data storage device incorporating a data reader according to claim 1.

9. A method of reading data comprising user data and non-user data written across at least two channels of a data-holding medium, said data being arranged into a plurality of data items each containing user data and non-user data, with said non-user data holding information relating to said user data, including a header with information relating to said user data and header error detection information, and data items written across the said channels at the same time being identified as a set of data items, said method comprising:

reading each said channel of said data-holding medium;

generating a data signal comprising said data items for each channel;

processing said data signals of a set of data items, including processing said header error detection information to detect any of said headers of said set of data items which are in error; and correcting a said header which is in error by obtaining information from a correct said header.

10. A method of reading data according to claim 9, wherein said step of correcting said header includes determining a header which is correct, and modifying information taken from said correct header to correct said header which is in error.

11. A method of reading data according to claim 9, wherein said step of determining a correct header includes checking that said header error detection information is correct.

12. A method of reading data according to claim 11, wherein said step of correcting a header which is in error includes creating a new header by taking correct header information from a correct header and modifying channel specific information from said correct header.

13. A method of reading data according to claim 12, wherein said header information is a write pass number and a general writing sequence position.

14. A method of reading data according to claim 12, wherein correcting said header includes writing said new header to a spare memory storage area in a data reader.

15. A computer readable medium having stored therein instructions for causing a processing unit to execute the method of claim 9.

* * * * *